United States Patent [19]

Chien

[11] Patent Number: 5,168,654
[45] Date of Patent: Dec. 8, 1992

[54] INSECT-REPELLENT DEVICE

[76] Inventor: Hsiu-Hung Chien, 2F, No. 113, Sec. 2, An Kang Rd., Hsin Tien City, Taipei Hsien, Taiwan

[21] Appl. No.: 890,080

[22] Filed: May 29, 1992

[51] Int. Cl.$^5$ ............................................. A01M 13/00
[52] U.S. Cl. ........................................ 43/129; 43/125; 422/306; 239/59; 239/136; 261/DIG. 65; 392/390
[58] Field of Search .................... 43/125, 129; 239/44, 239/59, 135, 136; 422/29, 38, 298, 306; 261/DIG. 65; 392/390

[56] References Cited

U.S. PATENT DOCUMENTS

| | | | |
|---|---|---|---|
| 2,616,024 | 10/1952 | Laibow | 43/129 |
| 2,813,187 | 11/1957 | Rovira | 422/306 |
| 3,421,841 | 1/1969 | Wittwer | 43/129 |
| 3,993,444 | 11/1976 | Brown | 261/DIG. 65 |
| 4,228,124 | 10/1980 | Kashihara | 43/125 |
| 4,425,302 | 1/1984 | Pons Pons | 43/129 |
| 4,675,504 | 6/1987 | Syhajda | 43/129 |
| 4,745,705 | 5/1988 | Yamamoto | 43/125 |
| 4,959,925 | 10/1990 | Nelson | 43/125 |
| 5,095,647 | 3/1992 | Zobele | 43/129 |

*Primary Examiner*—Kurt C. Rowan
*Attorney, Agent, or Firm*—Varndell Legal Group

[57] ABSTRACT

An insect-repellent device comprising a housing to hold a charger and a circuit board, two insect-repellent units movably received in two recessed surface portions on the outside of the housing and electrically connected to the circuit board by two separate electric wires, two reel assemblies fastened on housing at two opposite sides and controlled to let off or take up the insect-repellent units, a power switch for power control, a sterilization control switch for sterilization control, and indicator lamps for power and sterilization indications respectively.

1 Claim, 6 Drawing Sheets

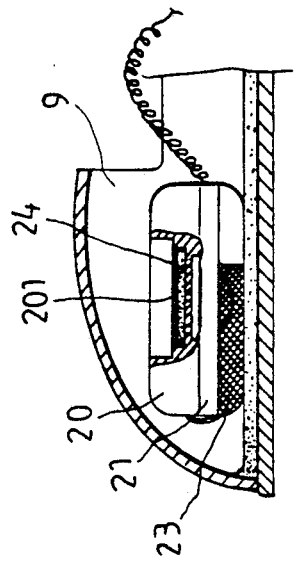
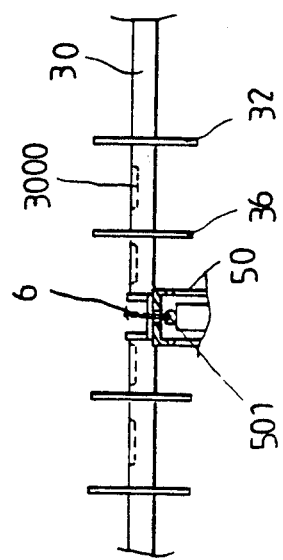
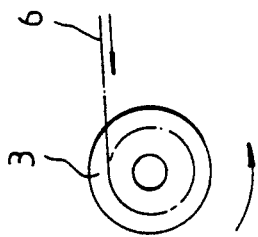

INSECT-REPELLENT DEVICE

BACKGROUND OF THE INVENTION

The present invention relates to an insect-repellent devices and relates more particularly to an insect-repellent device which is electrically controlled to heat solid insect-repellent chemicals in repelling insects.

In sterilizing a wardrobe, cabinet or room or repelling insects therefrom, a variety of solid state or liquefied chemical compounds may be used. Spraying a perfume or deodorizer in a space can only destroys or masks unpleasant odors but can not destroy or repel insects. If an agent which destroys or repels insects is to be used, it must be very carefully employed so as not to cause any contamination problem.

SUMMARY OF THE INVENTION

The present invention has been accomplished to eliminate the aforesaid problems. According to one aspect of the present invention, the insect-repellent device uses lamp bulbs to heat any of a variety of solid chemicals in repelling insects or destroying unpleasant odors. According to another aspect of the present invention, the insect-repellent device comprises two insect-repellent units that can be moved out of the device and placed in different locations to repel insects or destroy unpleasant odors. According to still another aspect of the present invention, the insect-repellent device comprises two reel assemblies controlled to let off the insect-repellent units or take them up. According to still another aspect of the present invention, the insect-repellent device comprises a hanger on the bottom edge thereof for hanging on a wall or supporting the device on a flat surface in oblique position.

BRIEF DESCRIPTION OF THE DRAWINGS

FIG. 3 is a sectional view of the insect-repellent unit;

FIG. 4 is a plain view showing that the fixed end of the electric wire is extended from the reel and connected to the contact on the electric connector inside the holder;

FIG. 5 is a sectional side view showing that the electric wire is extended from the reel and guided by the guide rod;

FIG. 6 is a plain view showing that the electric wire has been taking up;

DETAILED DESCRIPTION OF THE PREFERRED EMBODIMENT

Figure 1:
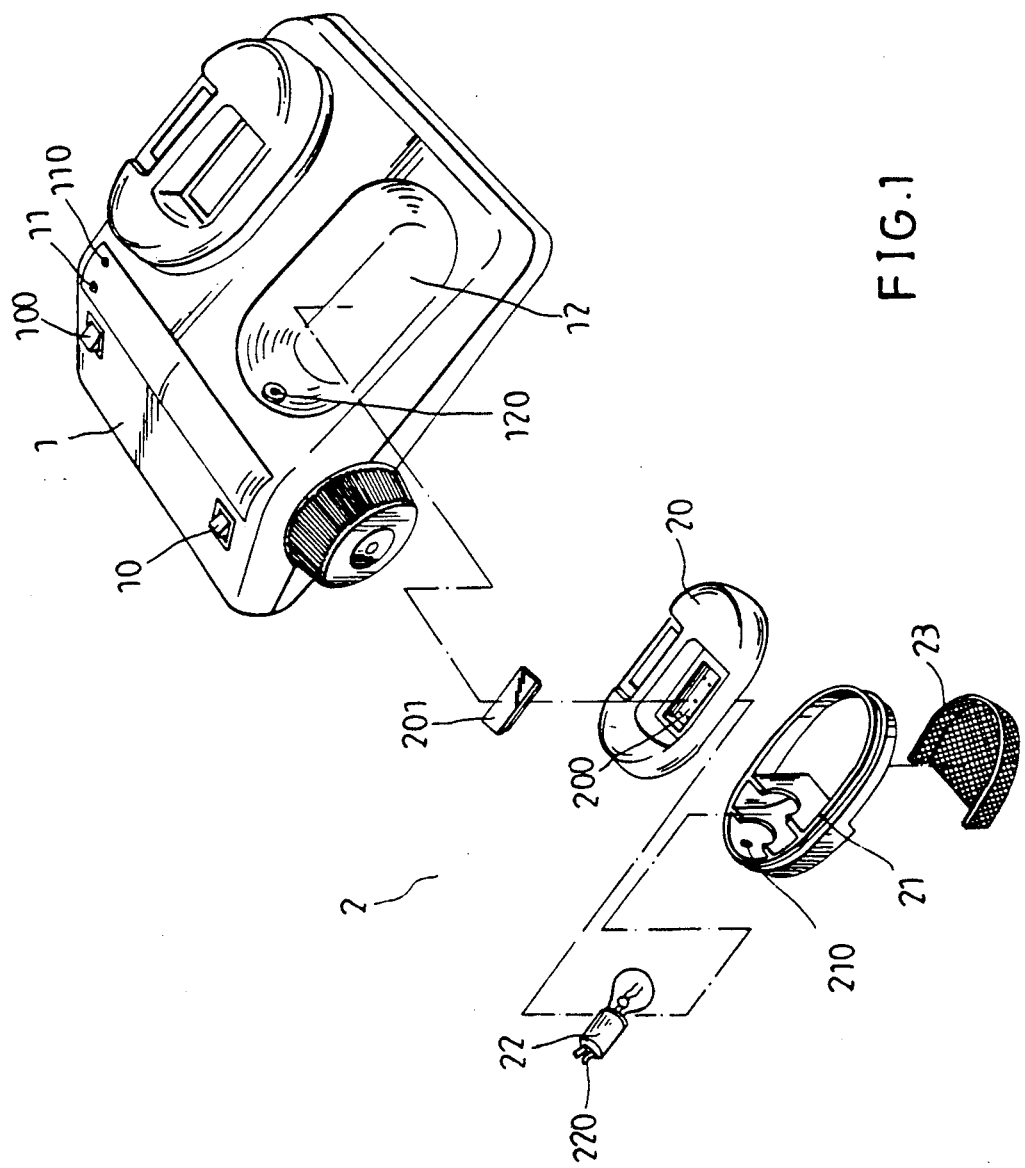
FIG. 1 is an elevational view of the preferred embodiment of the insect-repellent device of the present invention and an exploded view of an insect-repellent unit thereof.
Figure 2:
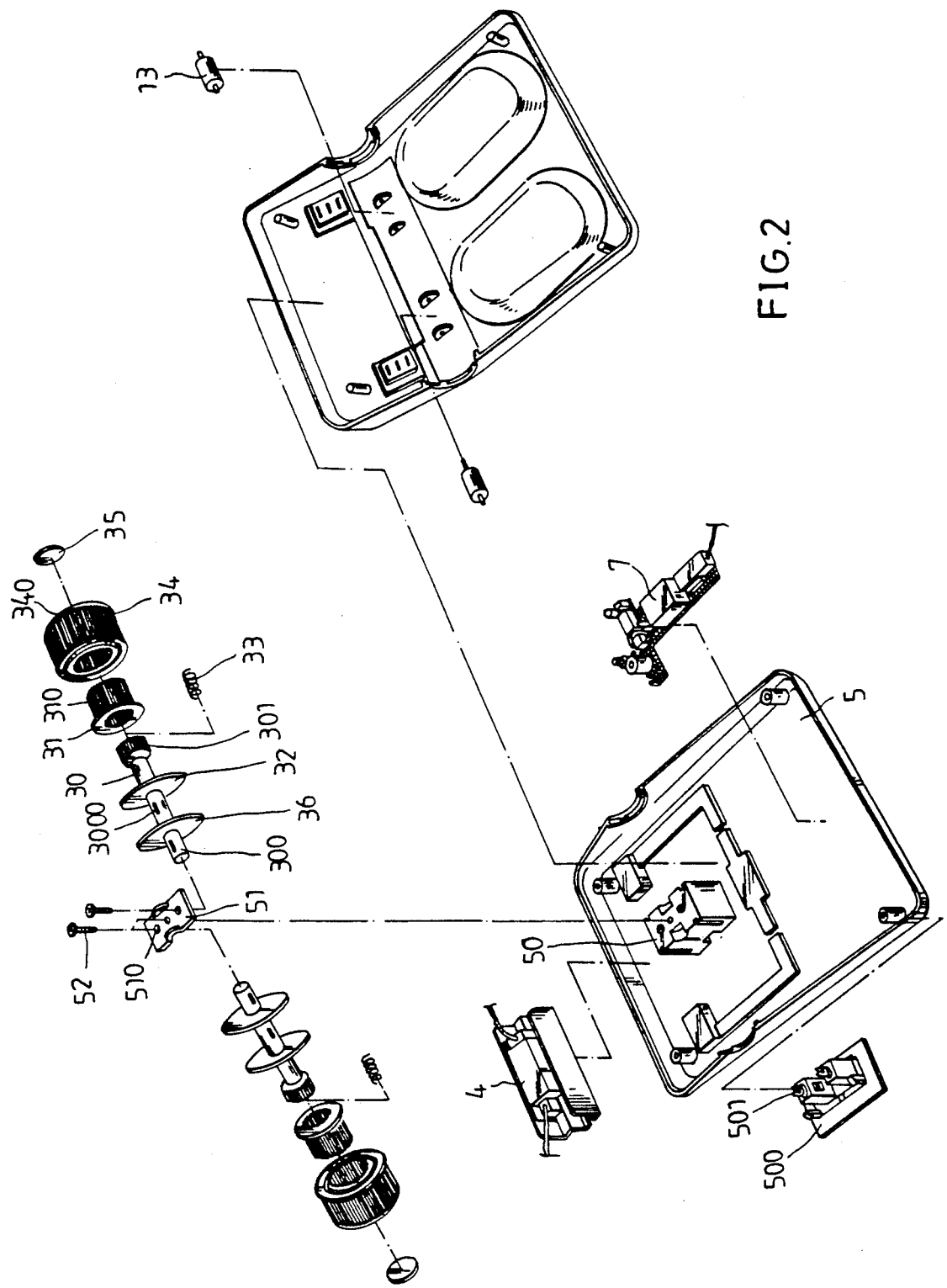
FIG. 2 is an exploded view of the covering shell, the base, and the reel assemblies.

Referring to FIGS. 1 and 2, the preferred embodiment of the present invention is generally comprised of a covering shell 1, two insect-repellent units 2, two reel assemblies 3, a charger 4, and a base 5.

The covering shell 1 is made in a substantially rectangular shape comprising two switches, namely, the sterilization control switch 10 and the power switch 100, two indicator lamps, namely, the power indicator lamp 11 and the sterilization indicator lamp 110, two elongated, recessed surface portions 12 which receive the two insect-repellent units 2 respectively, two wire holes 120 on the two elongated, recessed surface portions 12 through which electric wires 6 are respectively inserted, and two guide rods 13 on the inside at two opposite locations for guiding electric wires 6.

The two insect-repellent units 2 are identical, see also FIG. 3, comprising each an upper shell 20 covered on a bottom shell 21 to hold a lamp bulb 22, and a metal wire mesh 23 covered on the bottom shell 21 at the bottom. The upper shell 20 comprises two elongated chambers 200 which receive solid chemicals 24 and are covered by two elongated cover boards 201 respectively. The solid chemicals 24 may be variously formed according to different preparations for repelling or destroying insects or destroying unpleasant odors. The lamp bulb 22 is connected to a lamp socket 220 received inside the bottom shell 21 below the elongated chambers 200 of the upper shell 20, which lamp socket 220 is connected to the charger 7 by an electric wire 6 which is inserted through a wire hole 210 on the bottom shell 21.

The two reel assemblies 3 are identical in structure and symmetrically fastened on the covering shell 1 and the base 5 at two opposite sides, comprising each a shaft 30 having one end 301 inserted into a hole on a cap-like bush 31, a compression spring 33 inserted inside the cap-like bush 31 to hold the shaft 30 in place, a rotary cap 34 mounted on the body 310 of the cap-like bush 31, and an insert 35 inserted into a hole (not shown) on the rotary cap 34. The shaft 30 comprises two circular flanges 32,36 respectively made from silicon rubber with a receiving chamber defined therebetween for winding an electric wire 6. The electric wire 6 which is wound on the shaft 30 of each reel assembly 3 has a fixed end 61 inserted through a hole 3000 on the shaft 30 and connected to a contact 501 on a connector 500 inside a holder 50 (see FIG. 4), and a free end 60 inserted through the wire hole 120 on either elongated, recessed surface portion 12 and the wire hole 210 on the bottom shell 21 of either insect-repellent unit 2 and connected to the respective lamp socket 220. Therefore, each electric wire 6 can be pulled out of the covering shell 1 at the desired length permitting the respective insect-repellent unit 3 to be separated from the covering shell 1 at placed at a distance (see FIG. 5). Each insect-repellent unit 2 and the respective electric wire 6 can be taken up by rotating the respective rotary cap 34 (see FIG. 6).

The charger 4 is fastened inside the base 5 to provide a circuit board 7 with the necessary working voltage. The circuit board 7 controls the operation of the operation of the sterilization control switch 10 and the power switch 100.

Figure 7:
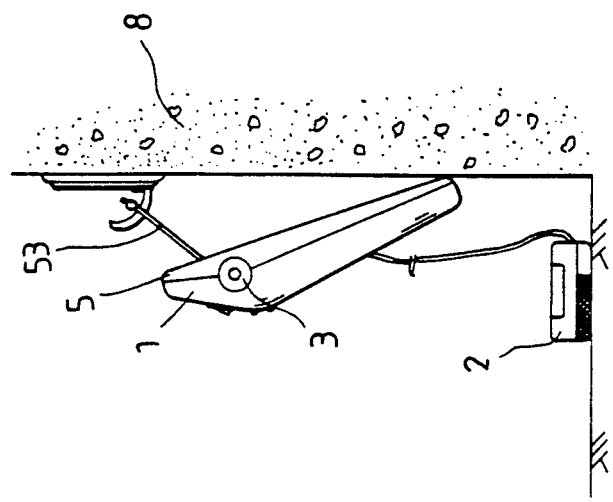
FIG. 7 is a plain view showing that the insect-repellent device can be hung on a wall by the hanger thereof.
Figure 8:
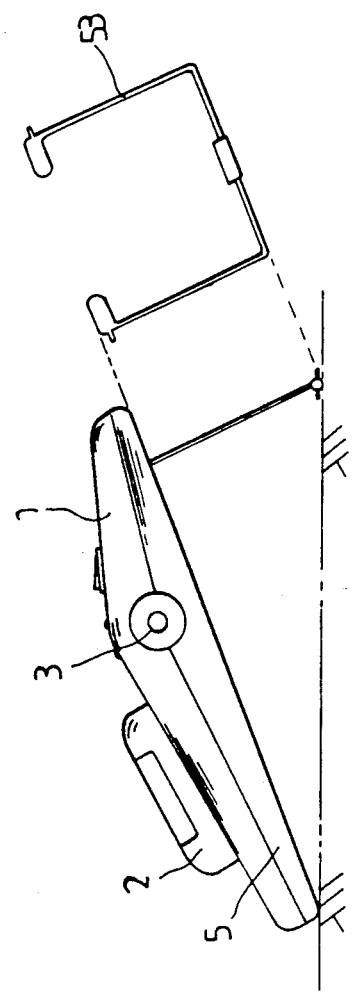
FIG. 8 is a plain view showing that the insect-repellent device is obliquely supported on a flat surface by the hanger thereof.
Figure 10:
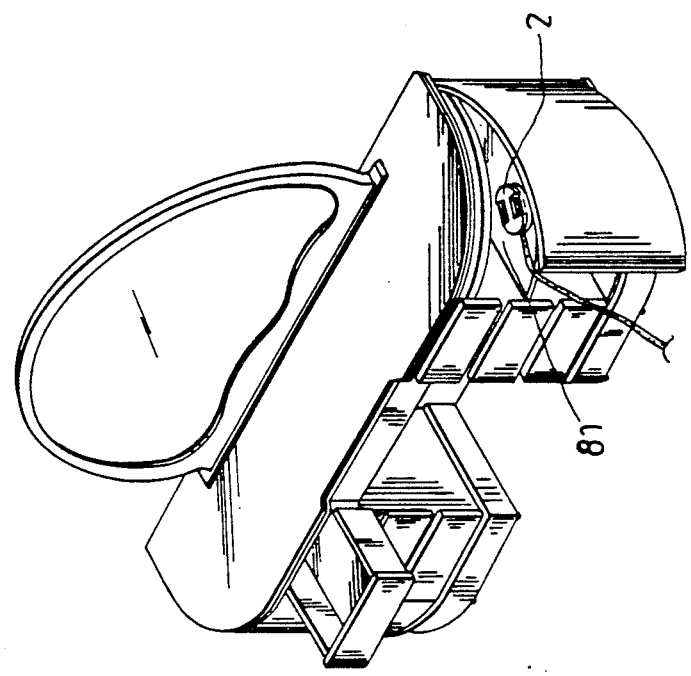
FIG. 10 illustrates that the insect-repellent device is placed in a dressing table to repel insects.
Figure 9:
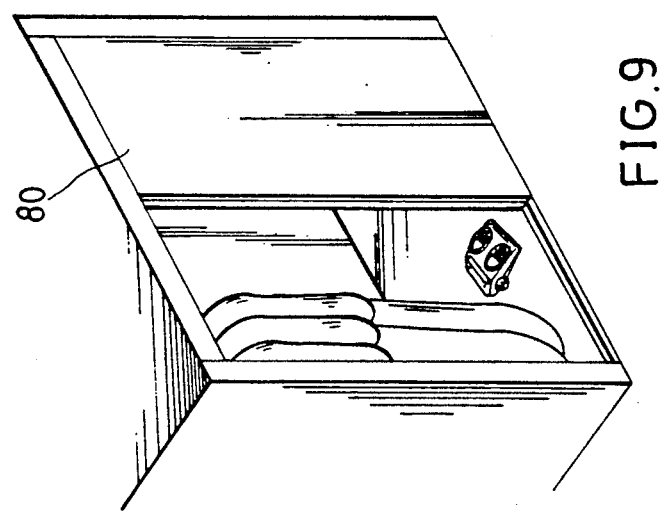
FIG. 9 illustrates that the insect-repellent device is placed in wardrobe to repel insects.
Figure 11:
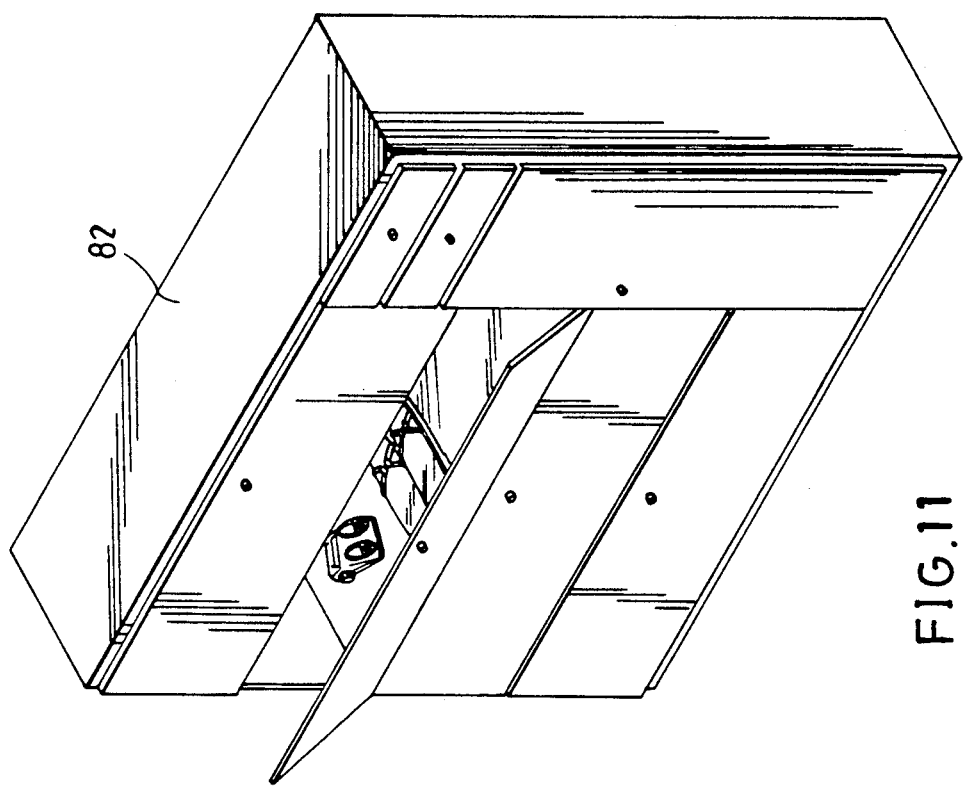
FIG. 11 illustrates that the insect-repellent device is placed in shoe cabinet to repel insects.

The base 5 is made in shape fitting the covering shell 1, comprising an electric connector 500 fastened inside a holder 50, a fastening plate 51 fastened to the holder 50 at the top to hold the opposite end 300 of the shaft 30 of each reel assembly 3. The fastening plate 51 has holes 510 at two opposite ends thereof, through which screws 52 are threaded into bolt holes (not shown) on the holder 50. The base 5 further comprises a hanger 53 on the bottom edge thereof (see FIG. 7) by which it is hung on a support.

Referring to FIGS. 7,8,9,10,11 and seeing FIG. 3 again, either insect-repellent unit 2 is moved out of the covering shell 1, and hung on a wall 8 (see FIG. 7) or placed in a shoe 9 (see FIG. 3), wardrobe 80, dressing table 81 or shoe cabinet 82. As soon as the two insect-repellent units 2 have been placed in the desired locations respectively, the power switch 100 is switched on. When electric power supply connected, the power indicator lamp 11 is turned on. The sterilization control switch 10 is then switched on to turn on the lamp bulb 22 in each insect-repellent unit 2, causing it to produce heat in heating a respective solid insect-repellent chemical 24. When not in use, switch off the sterilization control switch 10, and then rotate each rotary cap 34 to take up the respective insect-repellent unit 2 back to its original position in either elongated, recessed surface portion 12 on the covering shell 1.

I claim:

1. An insect-repellent device comprising:
   a base, said base comprising an electric connector fastened inside a holder, and a hanger on a bottom edge thereof for hanging;
   a charger and a circuit board fastened inside said base and electrically connected to said electric connector, said charger being to provide said circuit board with the necessary working voltage;
   a covering shell covered on said base at the top, said covering shell comprising a power switch, a sterilization control switch, a power indicator lamp, a sterilization indicator lamp, two elongated, recessed surface portions, two wire holes on said two elongated, recessed surface portions, two guide rods on the inside at two opposite locations;
   two reel assemblies symmetrically fastened on said covering shell and said base at two opposite sides, said reel assemblies comprising each a reel, said reel having one end inserted into a hole on a cap-like bush received inside said covering shell and an opposite end revolvably secured to said holder, a compression spring inserted inside said cap-like bush, a rotary cap mounted on said cap-like bush and driven to rotate said reel in taking up an electric wire or letting it off;
   two insect-repellent units respectively movably placed in said two elongated, recessed surface portions, said insect-repellent units comprising each an upper shell covered on a bottom shell to hold a lamp bulb, and a metal wire mesh covered on said bottom shell at the bottom, said upper shell comprising two elongated chambers covered by covering plates to hold solid insect-repellent chemicals, said bottom shell having a wire hole through which an electric wire is inserted with one end to said lamp bulb and an opposite end wound through either guide rod around the reel of either reel assembly and connected to said electric connector;
   wherein rotating said rotary cap causes the respective electric wire to be let off or taken up permitting the respective insect-repellent unit to be separated from said covering shell or moved back to the respective elongated, recessed surface portion; switching on said power switch and said sterilization control switch causes the lamp bulb in each insect-repellent unit to produce heat in heating solid insect-repellent chemicals for the purpose of repelling insects.

* * * * *